United States Patent
Bodnar et al.

[11] Patent Number: 5,263,440
[45] Date of Patent: Nov. 23, 1993

[54] INTAKE MANIFOLD FOR INTERNAL COMBUSTION ENGINE

[75] Inventors: Louis G. Bodnar, Westland; Michael A. Choma, Dearborn Heights; Donald R. Michie, Dearborn; William F. Stockhausen, Northville, all of Mich.

[73] Assignee: Ford Motor Company, Dearborn, Mich.

[21] Appl. No.: 43,041

[22] Filed: Apr. 5, 1993

[51] Int. Cl.⁵ .............................................. F02B 27/02
[52] U.S. Cl. ............................ 123/52 M; 123/52 MV
[58] Field of Search ..................... 123/52 M, 52 MV

[56] References Cited

U.S. PATENT DOCUMENTS

| | | | |
|---|---|---|---|
| 4,068,637 | 1/1978 | Takamiya | 123/52 M |
| 4,494,493 | 1/1985 | Morikawa | 123/52 M |
| 4,565,166 | 1/1986 | Takeda | 123/52 M |
| 4,703,729 | 11/1987 | Sakano | 123/308 |
| 4,708,097 | 11/1987 | Hatamura et al. | 123/52 M |
| 4,722,307 | 2/1988 | Okuno et al. | 123/90.38 |
| 4,919,087 | 4/1990 | Ogami et al. | 123/52 MV |

FOREIGN PATENT DOCUMENTS 59-0173520 10/1984 Japan.

*Primary Examiner*—Noah P. Kamen
*Attorney, Agent, or Firm*—Jerome R. Drouillard; Roger L. May

[57] ABSTRACT

An intake manifold 10 for a V-type internal combustion engine includes a first set of runners 12 feeding a first group of cylinders of the engine, a second set of runners 14 feeding a second group of cylinders of the engine, a first airbox 16 connected with and supplying air to the first set of runners, and a second airbox 18 connected with and supplying air to the second set of runners, with a communicating orifice 22 formed through a common wall which interconnects the airboxes, and further with a vacuum driven poppet valve 24 for controlling flow of air through orifice 22. The valve is preferably packaged as a cartridge and is inserted through an outer wall of one airbox.

15 Claims, 3 Drawing Sheets

INTAKE MANIFOLD FOR INTERNAL COMBUSTION ENGINE

BACKGROUND OF THE INVENTION

This invention relates to a system for providing induction air to the cylinders of a an internal combustion engine having more than one group of cylinders. With a V-type internal combustion engine, which is but one example of the types of engines with which the present invention may be employed, opposite banks of cylinders are fed from two airboxes having a communication valve installed in a common wall extending between the airboxes. Conventional manifold communication valves typically employ butterfly-type valve mechanisms which are difficult to actuate and seal reliably. Moreover, special machining is required to achieve an acceptable seal between a butterfly valve and passage. A system according to the present invention overcomes these difficulties and provides a cost effective, functionally superior structure for accomplishing the communication between adjacent portions of a dual-plenum or other type of multiple airbox intake manifold.

SUMMARY OF THE INVENTION

An intake manifold for a V-type internal combustion engine includes a first set of runners feeding a first group of cylinders of the engine, a second set of runners feeding a second group of cylinders of the engine, and first and second airboxes connected with and supplying air to the first and second set of runners, respectively. The airboxes are joined via a common wall which contains a communicating orifice formed therethrough. The communicating orifice accordingly interconnects the airboxes. Air flow through the communicating orifice is governed by a valve means The communicating orifice is preferably circular so as to allow the valve means to comprise a circular poppet having a head which is selectively engageable with the orifice. The poppet is positioned by a linearly reciprocable motor which is mounted upon an outer wall of one of the airboxes. The linear motor includes a circular mounting plate which is engaged with a circular receiver aperture formed in an outer wall of one of the airboxes. This circular receiver aperture and the communicating orifice between the airboxes are concentric and lie in parallel planes, with the diameter of the circular receiver aperture exceeding the diameter of the communicating orifice.

DETAILED DESCRIPTION OF THE PREFERRED EMBODIMENTS

Figure 5:
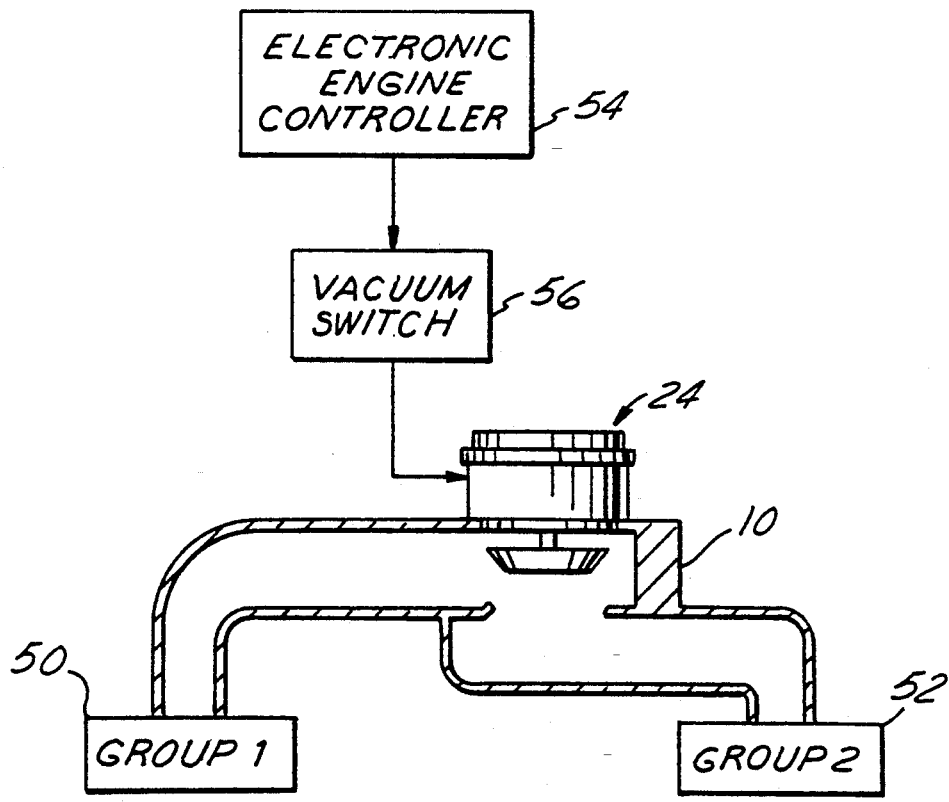
FIG. 5 is a schematic representation of a system according to the present invention.

As shown generally in FIG. 5, an intake manifold, 10, supplies induction air to a first cylinder group 50, as well as to a second cylinder group, 52, of an internal combustion engine. As further shown in FIG. 5, an electronic engine controller, 54, operates a communication valve structured according to the present invention. Those skilled in the art will appreciate in view of this disclosure that a manifold according to the present invention could be controlled not only by the illustrated engine control computer, but also by other conventional means such as ported vacuum switches, throttle position sensing switches, and other devices suggested by this disclosure. In general, engine controller will operate valve 24 in response to engine speed or other sensed engine operating parameters.

Figure 1:
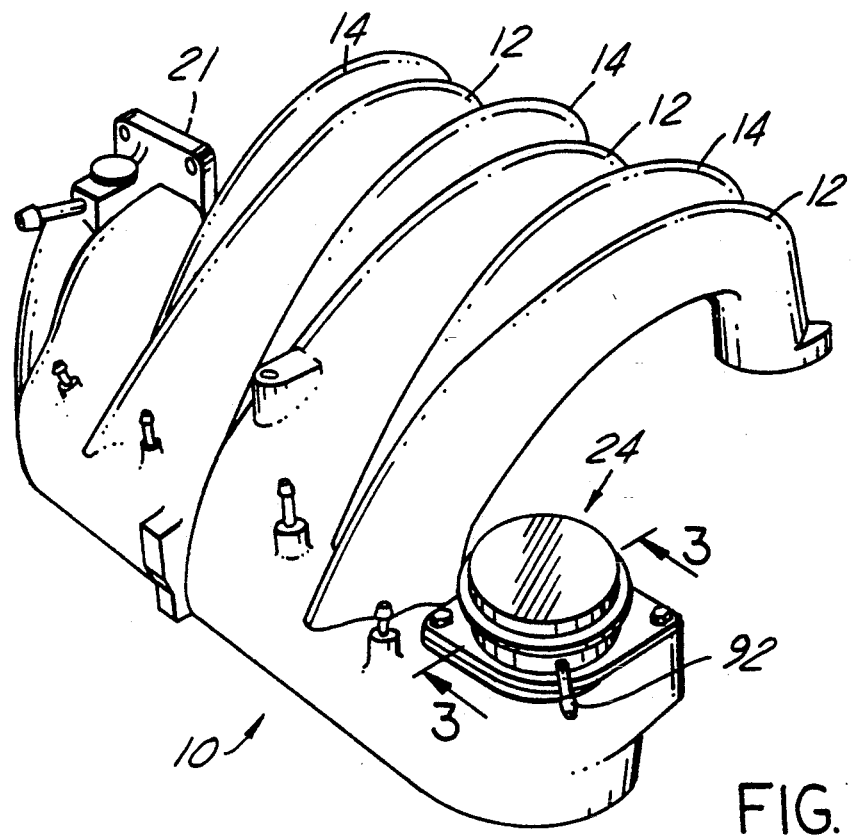
FIG. 1 is a perspective view of an intake manifold equipped according to the present invention.
Figure 2:
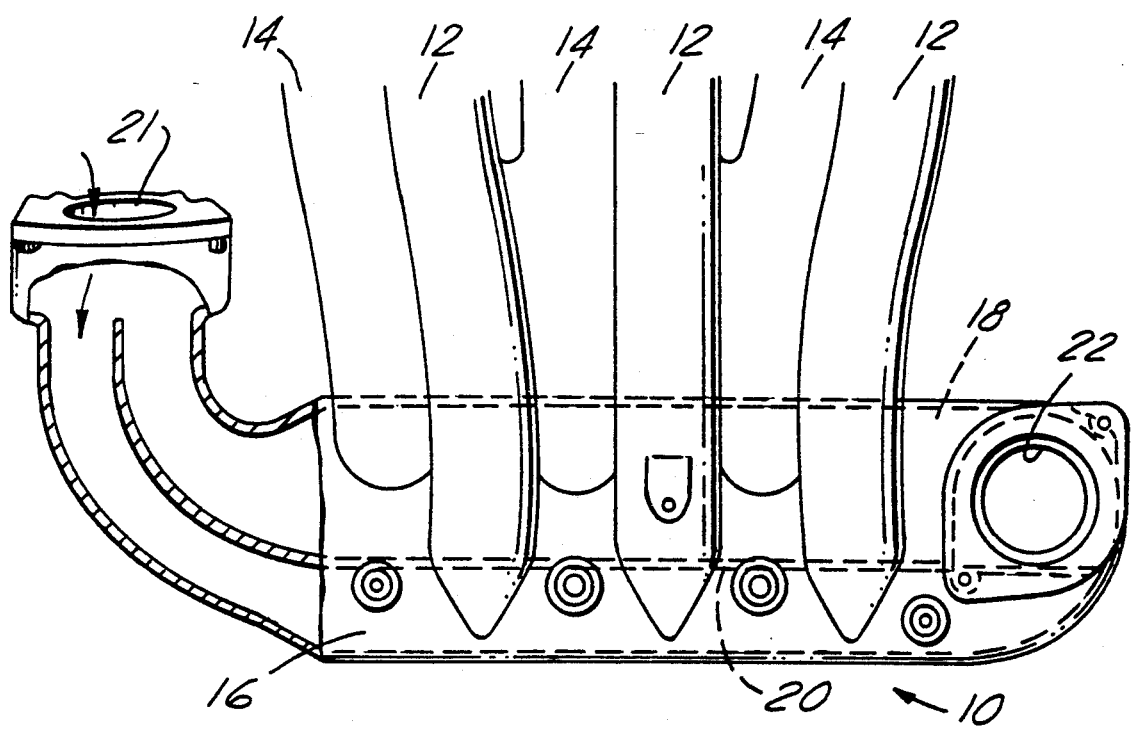
FIG. 2 is a plan view, partially cut away, of the manifold shown in FIG. 1.
Figure 3:
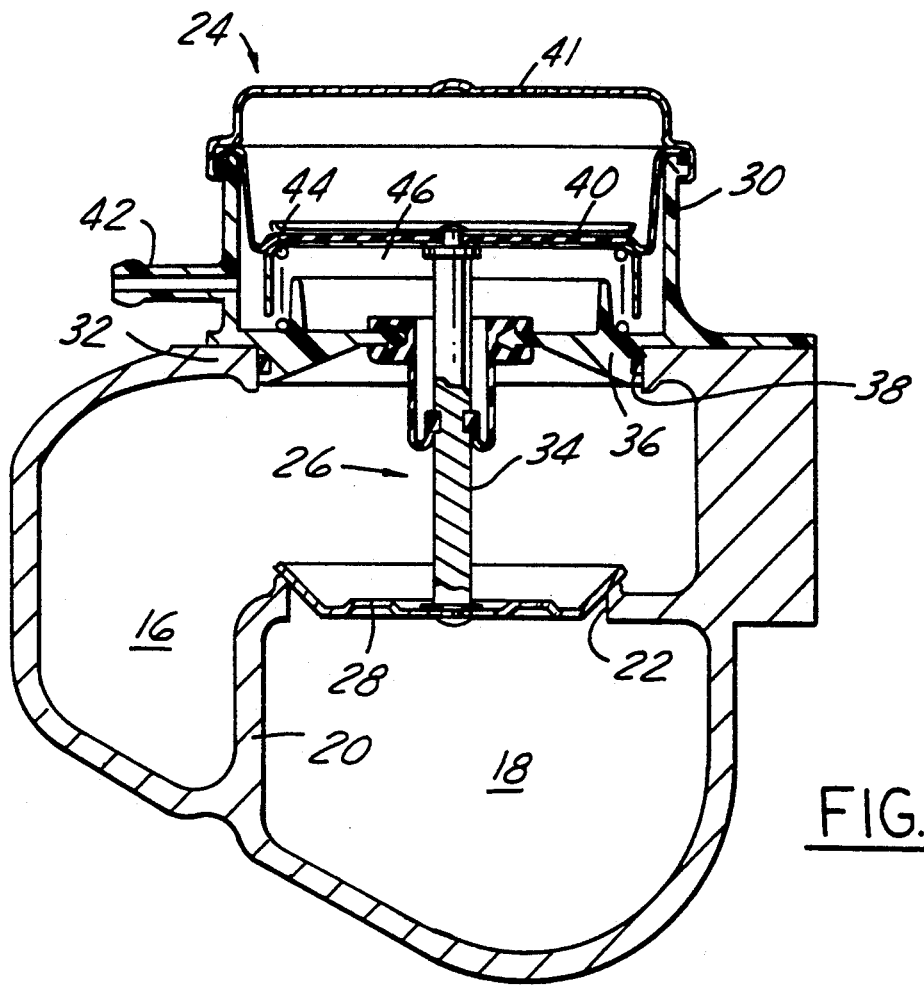
FIG. 3 is a sectional view of a manifold according to FIGS. 1 and 2, taken along the line 3—3 of FIG. 1, but also including a linear motor and poppet valve according to the present invention.
Figure 4:
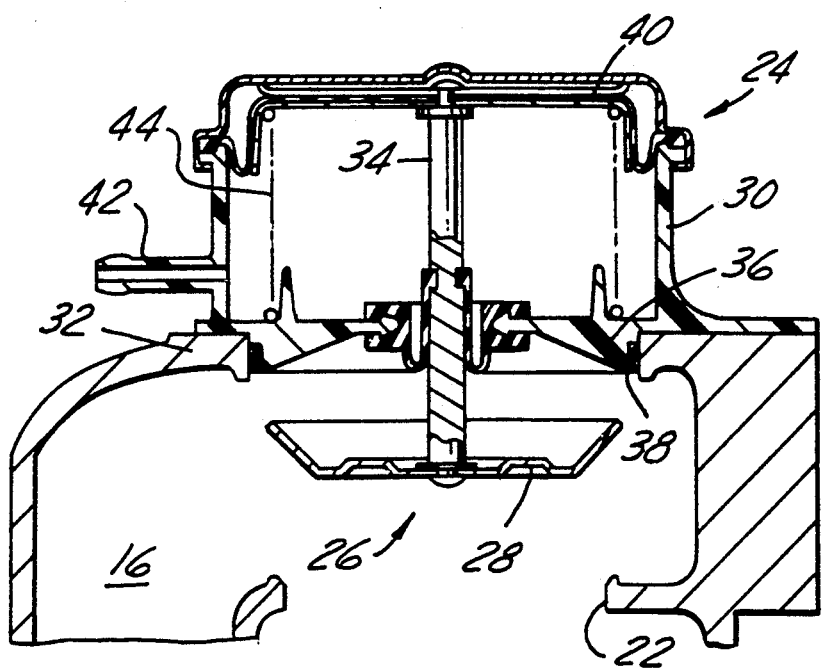
FIG. 4 illustrates the valve mechanism of FIG. 3 in an open position.
Figure 6:
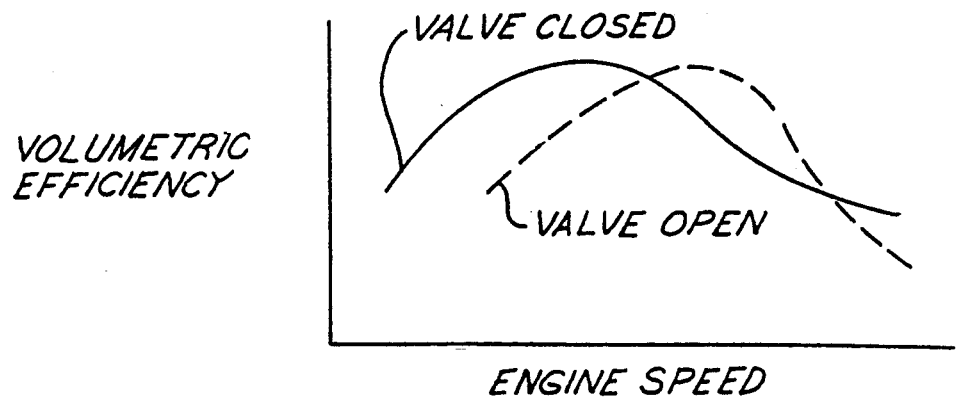
FIG. 6 is a graphical representation which shows the effects of a system according to the present invention upon engine operation.

FIGS. 1 and 2 illustrate an intake manifold according to the present invention. A first airbox, 16, (FIG. 2) supplies air to a first set of runners, 12, and a second airbox, 18, supplies induction air to a second set of runners, 14. Runners 12 serve to feed induction air to cylinder group 50 of FIG. 5, whereas runners 14 serve to feed induction air to cylinder group 52 of FIG. 5. As shown in FIGS. 2, 3, and 4, first airbox 16 and second airbox 18 are joined with and share a common wall 20, which extends between the airboxes. Common wall 20 is breached by a communicating orifice 22, with the airflow through orifice 22 being controlled by communication valve assembly 24. The communicating orifice allows the engine to be operated more efficiently during certain engine speeds by allowing the engine to be tuned essentially as two individual engines each with half the total number of cylinders when the communication valve is closed, or as a single engine having the total number of cylinders when the communication valve is open. Those skilled in the art will appreciate in view of this disclosure that a communication valve according to the present invention could be employed not only with the illustrated V-type of engine, but also with inline engines having more than one group of cylinders. With even-firing engines in which the firing cylinders alternate equally and progressively from one group of cylinders to another such as with an even firing V-6 engine, the volumetric efficiency will be enhanced by opening or closing communication valve 24 at the appropriate engine speed, as illustrated graphically in FIG. 6. As shown in FIG. 6, the enhanced torque resulting from the operation of valve 24 provides the highest output at each engine speed.

As noted above, communicating orifice 22 between airboxes 16 and 18 is selectively occludable by means of valve assembly, 24, which is mounted upon outer wall 32 of first airbox 16 (FIGS. 3 and 4). Notice that valve assembly 24 includes a circular mounting plate, 36, which is received within a circular receiver aperture, 38, formed in outer wall 32. Valve assembly 24 is thus packaged as a cartridge which is inserted as a whole into circular receiver aperture 38. As shown in FIGS. 3 and 4, communicating orifice 22 is concentric with circular receiver aperture 38. Moreover, orifice 22 and aperture 38 lie in parallel planes. As a result, the machining of communicating orifice 22 and circular receiver aperture 38 is simplified because the required machine tools may act along a common axis to machine both of these openings. Also, unlike prior art butterfly designs, valve 24 does not require an inner pivot, which must be painstakingly machined in order to provide free operation of the butterfly. Beneficially, because the diameter of circular receiver aperture 38 exceeds the diameter of communicating orifice 22, valve assembly 24 may be inserted as a whole from the outside through outer wall 32 and into its final position. The cartridge design of valve assembly 24 is economical to produce and servicing and adjustment are simplified over known designs.

FIG. 3 illustrates details of a poppet valve mechanism according to the present invention. A circular valve head, 28, which is rigidly attached to a shaft, 34, is selectively engageable with communicating orifice 22. Shaft 34 extends through outer wall 32 and is linked with a power diaphragm, 40. In effect, valve motor 30 is a rolling diaphragm vacuum motor. Engine vacuum, or for that matter, vacuum from any other available source, applied to a vacuum connector, 42, by engine controller 54 via vacuum switch 56, will maintain valve head 28 in contact with the valve seat located at the periphery of communicating orifice 22, thereby preventing the flow of air from one airbox to the other. If airflow is desired, though, the vacuum will be released by engine controller 54 and vacuum chamber 46 will be allowed to come up to atmospheric pressure, at which time a spring, 44, will push valve head 28 away from communicating orifice 22 and allow free flow of air between the airboxes. The stroke of linear valve motor 30 is such that the swept area defined by the outer periphery of valve head 28 during a full stroke of the poppet exceeds the area of communicating orifice 22. In this manner, free flow of air is permitted between the airboxes. In order to achieve a satisfactory response of valve assembly 24, it has been determined that the area of power diaphragm 40 which is exposed to vacuum should comprise 120-200% of the area of communicating orifice 22. Those skilled in the art will appreciate in view of this disclosure that other types of linear actuators could be employed in a manifold system according to the present invention. Such devices could include, for example, stepper motor driven or other types of pneumatic or hydraulic motors or power cylinders.

Although an intake manifold according to the present invention may have the first airbox superimposed upon the second airbox, as illustrated in FIG. 3, the airboxes may extend in side-by-side fashion and have a more cylindrical cross-section according to the needs of a designer wishing to equip an engine with a manifold according to the present invention. In either event, the airboxes would be of generally parallelepiped configuration with a common inlet passage, 21, for supplying both airboxes with induction air. As is seen from FIGS. 1 and 2, the common inlet passage opens onto one end of the airboxes, with control valve 24 and communicating orifice 22 lying opposite the end at which air is introduced by inlet passage 21.

We claim:

1. An intake manifold for an internal combustion engine, comprising:
    a first set of runners feeding a first group of cylinders of said engine;
    a second set of runners feeding a second group of cylinders of said engine;
    a first airbox connected with and supplying air to said first set of runners;
    a second airbox connected with and supplying air to said second set of runners, with said second airbox being joined with and sharing a common wall with said first airbox;
    a communicating orifice formed through said common wall for interconnecting said airboxes, and
    valve means for controlling the flow of air through said orifice, with said valve means comprising a circular poppet valve having a head which is selectively engageable with said orifice.

2. An intake manifold according to claim 1, wherein said valve means comprises a cartridge assembly.

3. An intake manifold according to claim 1, wherein said poppet valve is positioned by a linearly reciprocable motor which is mounted upon an outer wall of said first airbox.

4. An intake manifold according to claim 3, wherein said linear motor further comprises a circular mounting plate which is engaged with a circular receiver aperture formed in the outer wall of the first airbox.

5. An intake manifold according to claim 4, wherein said circular receiver aperture and said communicating orifice are concentric and lie in parallel planes, with the diameter of the circular receiver aperture exceeding the diameter communicating orifice.

6. An intake manifold according to claim 3, wherein said linear motor comprises a vacuum motor having a power diaphragm, with said diaphragm being supplied with vacuum from said engine, with the application of vacuum to said vacuum motor diaphragm being controlled by an electronic engine controller.

7. An intake manifold according to claim 6, wherein the area of said diaphragm which is exposed to said vacuum comprises 120 to 200 percent of the area of said communicating orifice.

8. An intake manifold according to claim 6, wherein the stroke of said linear motor is of sufficient magnitude such that the swept area defined by the outer periphery of said valve head during a full stroke of said poppet exceeds the area of said communicating orifice.

9. An intake manifold according to claim 1, wherein said valve means comprises a cartridge assembly including at least said poppet valve and a linearly reciprocable motor for positioning said poppet valve, with said cartridge being mounted from outside said manifold upon said outer wall, and with said poppet extending through said outer wall.

10. An intake manifold according to claim 9, wherein said linear motor comprises a shaft extending through said outer wall and into the interior of said first airbox, with said shaft having said valve head mounted thereto.

11. An intake manifold according to claim 1, wherein said first airbox is vertically superimposed upon said second airbox and said airboxes are located adjacent the top of one of said groups of cylinders.

12. An intake manifold according to claim 1, wherein said engine is of a v-type having two banks of cylinders.

13. An intake manifold for a v-type internal combustion engine, comprising:
    a first set of runners feeding a first group of cylinders of said engine;
    a second set of runners feeding a second group of cylinders of said engine;
    a first airbox, generally of parallelepiped configuration, connected with and supplying air to said first set of runners;
    a second airbox, also being of generally parallelepiped configuration, connected with and supplying air to said second set of runners, with said second airbox underlying and joined with and sharing a common wall with said first airbox;

a common inlet passage for supplying both of said airboxes with induction air, with said common inlet passage opening into one pair of adjacent ends of said airboxes;

a circular communicating orifice formed through said common wall for interconnecting said airboxes, with said orifice being located near the ends of said airboxes lying opposite the ends at which air is introduced by said common passage; and valve means for controlling the flow of air through said orifice, with said valve means comprising a circular poppet valve having a head which is selectively and axially engageable with said communicating orifice, with said head being attached to a shaft having a one end incorporated within a linearly reciprocable motor mounted upon an outer wall of said first airbox, with said shaft and valve head extending through said outer wall and into the interior of said first airbox in a location proximate said communicating orifice such that said shaft and motor may selectively maintain said valve head in sealing contact with the periphery of said communicating orifice.

14. An intake manifold according to claim 13, wherein said valve means is packaged as a removable cartridge.

15. An intake manifold according to claim 14, wherein said valve means comprises a vacuum motor supplied with engine vacuum by means of a vacuum switch which is controlled by an electronic engine controller which senses at least engine speed.

* * * * *